June 12, 1928.  
T. J. STURTEVANT  
1,673,343  
AIR SEPARATOR  
Filed Aug. 2, 1927     3 Sheets-Sheet 3
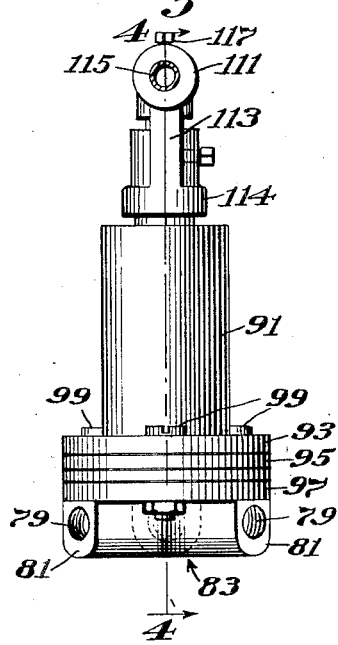
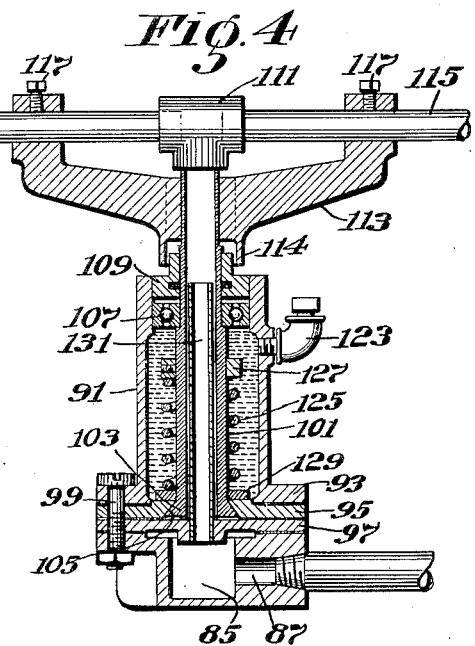
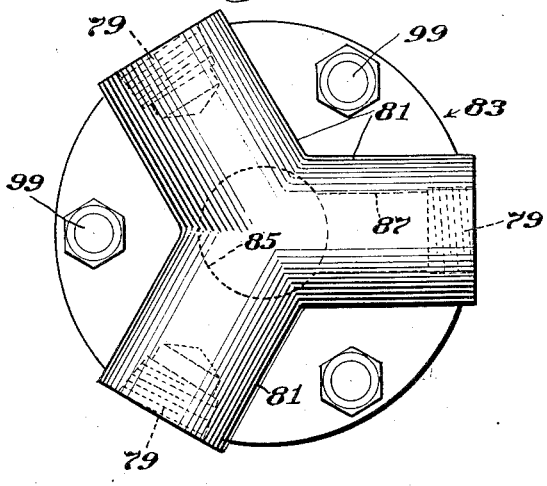
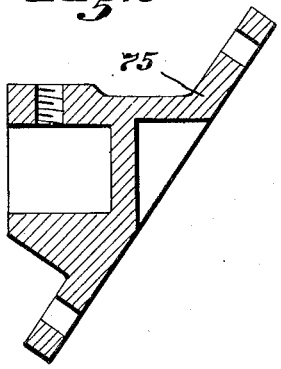
Inventor:  
Thomas J. Sturtevant  
by Henry T. Williams,  
Attorney Patented June 12, 1928.

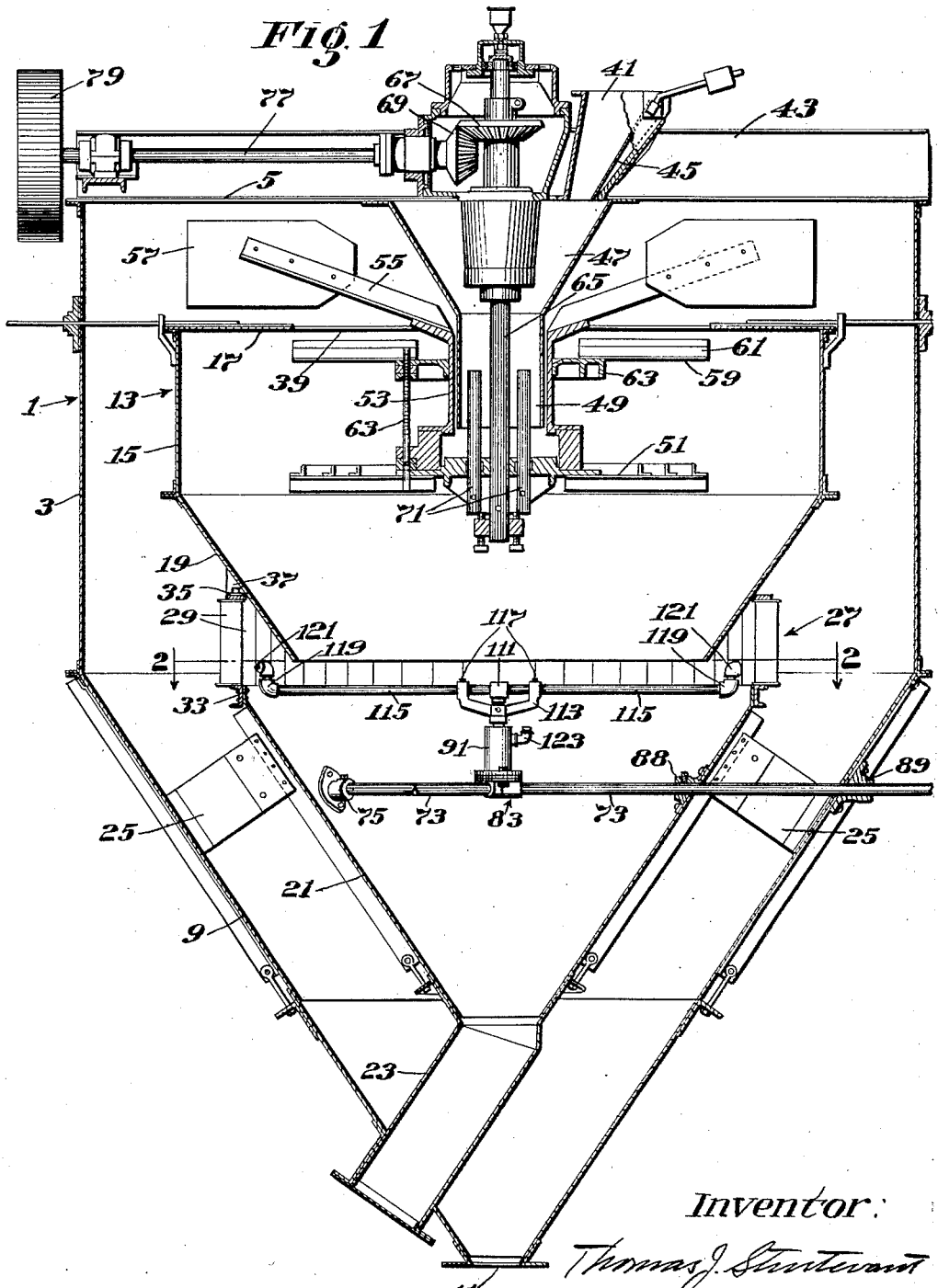

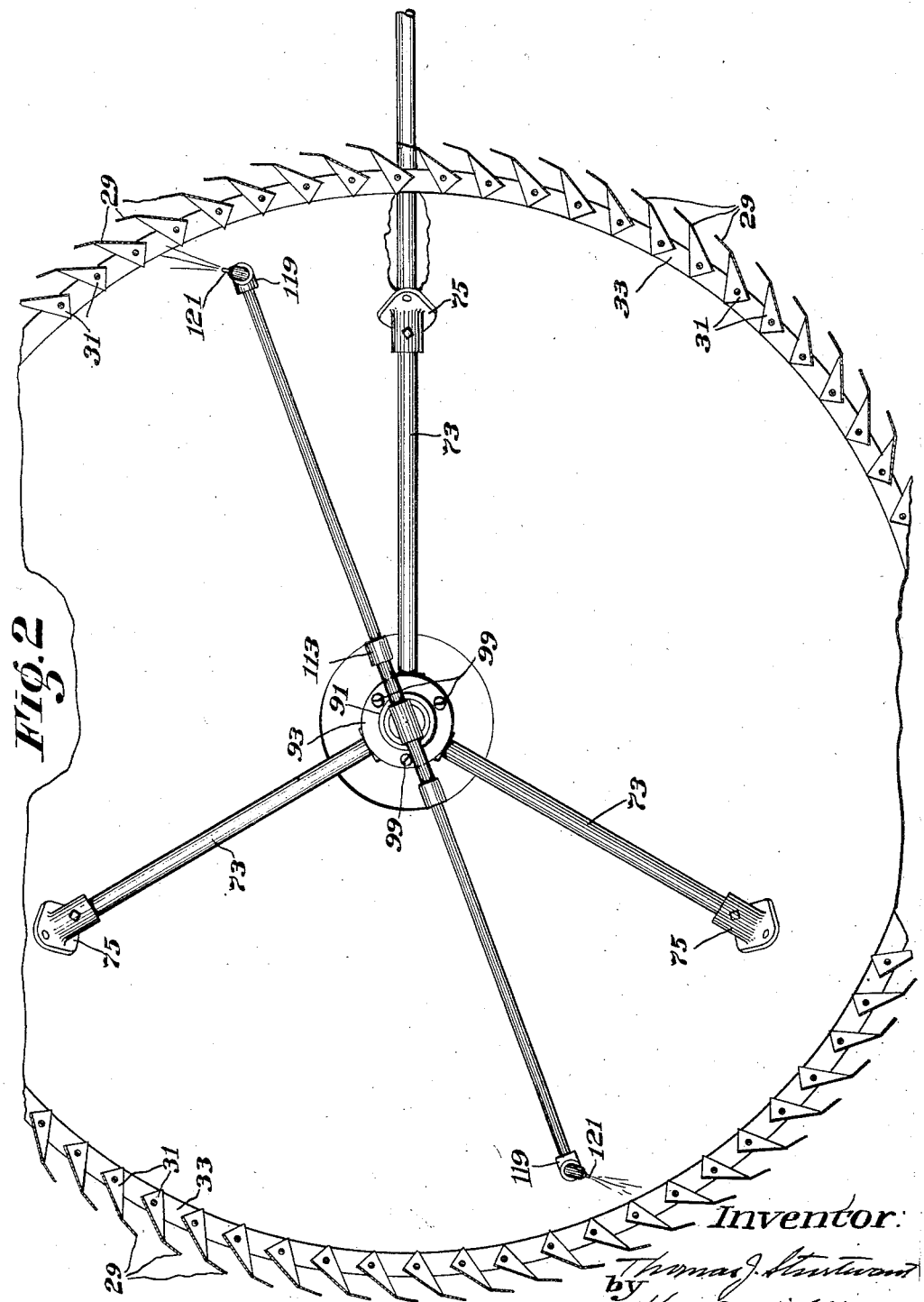

1,673,343

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

AIR SEPARATOR.

Application filed August 2, 1927. Serial No. 210,027.

The invention to be hereinafter described relates to air separators for grading materials wherein the separation is accomplished by an air current moving upward in a separating chamber and downward in a settling chamber. The air current, induced by a fan, is caused to circulate through the chambers. The materials to be graded are fed into the separating chamber and are received by a rotary distributor which throws the materials out across the rising air current under the influence of centrifugal force. The heavier particles gravitate down through the air current in the separating chamber and are delivered therefrom through a discharge spout, while the lighter particles are carried upward by the air current over into the settling chamber where they gravitate downward and are delivered through another discharge spout.

The separating chamber has an inlet and an outlet communicating with the settling chamber. The inlet may be formed by a space between upper and lower shells of the separating chamber. In this space a series of vanes may be mounted for promoting a whirl of the air current as it passes from the settling chamber to the separating chamber and for regulating the velocity of the air current at the inlet.

Heretofore, it has been found that materials being graded accumulate on parts at the spaces between the vanes and build up thereon, thereby more or less choking said spaces. As a consequence the effective openings between the vanes and the grading effect are objectionably varied.

Therefore the purpose of the present invention is to provide simple and effective means for clearing from the spaces between the vanes any materials which may accumulate therein.

The character of the invention may be best understood by reference to the following description of a good form thereof shown in the accompanying drawings, wherein:

Fig. 1 is a vertical section through a separator embodying the invention;

Fig. 2 on an enlarged scale is a horizontal section taken on line 2—2 of Fig. 1;

Fig. 3 is a side elevation of the portion of the clearer means;

Fig. 4 is a vertical section taken on line 4—4 of Fig. 3;

Fig. 5 on an enlarged scale is a view looking upward toward the bottom of the clearer means shown in Fig. 3; and Fig. 6 on an enlarged scale is a section through one of the brackets for the tripod.

Referring to the drawings, the separator shown therein as one good form of the invention comprises an outer casing 1 (Fig. 1) consisting of a drum 3 having a head 5 at the upper end thereof and a cone 9 at the lower end thereof terminating in a discharge spout 11.

Within and spaced from the outer casing is an inner casing 13 consisting of a drum 15 having a head 17 at the upper end thereof, and a conical shell 19 at the lower end thereof. Beneath and spaced from the upper conical shell is a lower conical shell 21 communicating with a discharge spout 23 which projects through an opening in the cone 9 of the outer casing. The lower shell 21 of the inner casing is supported by legs 25 interposed between and secured to the shell 21 and the cone 9.

A space between the upper and lower shells of the inner casing provides an inlet 27 for the passage of the air current from the settling chamber into the separating chamber. To regulate the air current and promote a whirl thereof at the inlet, a series of vanes 29 is provided, each having wings 31 at the upper and lower ends thereof. The vanes are mounted on a channel ring 33 secured to the upper end of the lower shell 21. A ring 35 rests upon the tops of the vanes and is secured by brackets 37 to the upper shell of the inner casing. The lower wings of the vanes are connected by bolts to the channel ring 33, and the upper wings are connected by bolts to the ring 35. The construction is such that the vanes support the upper shell of the inner casing and are adapted to be pivotally adjusted on the bolts to vary the openings between the vanes and thereby vary the inlet opening and the velocity of the air current passing through the inlet. The air rising in the separating chamber passes through an outlet 39 in the head 17 of the inner casing into the settling chamber.

The materials to be graded are introduced into the separator through an upper hopper 41 mounted on channels 43 at the top of the outer casing, said hopper being provided with a weighted flap valve 45. The materials pass from the upper hopper into a lower hopper 47 of conical form and having a neck 49 projecting through the outlet 39 down into the separating chamber.

The materials are delivered through the neck of the lower hopper to a rotary distributor 51 attached to the lower end of a cylindrical hub 53 through which the neck extends. Attached to the upper end of the hub are arms 55 carrying blades 57 of a fan occupying the space between the heads of the outer and inner casings. This fan creates the air current which circulates through the separating and settling chambers.

A baffle plate 59 is located betwen the distributor and the head of the inner casing, and has flanges or vanes 61 projecting up therefrom serving as a centrifugal agitator. This baffle plate is mounted on a ring 63 encircling the hub 53, and may be adjusted vertically along said hub by screws 65 projecting up from the distributor to the baffle plate. These screws are confined against longitudinal movement relatively to the baffle plate and are threaded in holes in the ring 63.

The distributor, fan and baffle plate are carried as a unit by a vertical shaft 65 which projects up through the hopper 47 and through an opening in the head of the outer casing. A bevel gear 67 fast on the shaft meshes with a bevel gear 69 on a horizontal shaft 71 journalled in bearings carried by the channels 43, referred to. Fast on the shaft 71 is a pulley 72 which may be driven from a suitable source of power.

To stir the materials passing through the hopper 47 to the distributor, blades 81 may be mounted on the distributor and project up into the hopper neck 49.

In operation, the materials to be graded are introduced into the upper hopper 41, flow down through the lower hopper 47 to the rotary distributor, and are thrown outward under the influence of centrifugal force into the path of the air current rising in the separating chamber. The heavier particles gravitate down through this rising air current and are discharged through the spout 23. The lighter particles are carried up with the air current through the outlet 39 over into the separating chamber and pass down therein and are discharged through the spout 11. The air current travels in a circuit through the separating and settling chambers, and in the course of this circuit passes through the openings between the vanes 29 which promote the whirl of the air current and tend to prevent the lighter particles from being carried from the settling chamber through the inlet into the separating chamber.

The construction of the separator thus far described may be in general similar to the separators disclosed in my copending application Serial No. 113,395, filed June 3, 1926, and in Letters Patent of the United States No. 1,615,558, granted to me January 25, 1927.

As stated there is a tendency for materials to accumulate on the parts adjacent the openings between the vanes. This occurs principally on the top of the ring 23 and reduces the effective openings between the vanes and varies the velocity of the air current passing therethrough and consequently introduces a variable factor in the classification of the materials.

Means will now be described to prevent the materials from building up in said openings. This means, in the present instance, comprises a support conveniently in the form of a tripod (Figs. 1 and 2) having three tubular legs 73. Two of these have outer ends set in sockets of brackets 75 (Fig. 6) secured to the lower shell 21 of the inner casing, said ends being secured in the sockets by set screws. The inner ends of the tubes are screwed into tapped holes 79 in bosses 81 on the under side of a head 83 having a chamber 85 therein. One of these bosses has a port 87 communicating with one of the tubular legs and the chamber 85. This leg is longer than the others and projects out through a bracket 88 on the lower shell and through a bracket 89 on the cone of the outer casing, said leg being adapted to receive compressed air from a suitable source of supply, as more fully hereinafter described.

A housing 91 is mounted on the head 83 and has an outstanding flange 93 at the lower end thereof. Washers 95 and 97 are interposed between the housing flange and the head, and gaskets are interposed between the head and the washer 97, between the washers 95 and 97, and between the housing flange 93 and the washer 95. The head, housing flange, washers and gaskets are held in assembled relation by bolts 99.

A hollow shaft 101 projects up through the housing and has a conical head 103 engaging a similarly shaped seat or bearing 105 in the washer 95. The shaft is journalled in a ball bearing 107 adjacent the upper end of the housing. Above the ball bearing and fitted into the housing is a guide 109 for the shaft which projects up beyond the guide and is connected to a hub 111. Fast on the shaft between the hub and the guide is a spider 113 having a hood 114 projecting over a portion of the guide 109 to prevent entrance of dust thereat. Two tubes 115 are threaded into the hub and project through holes in the spider and are secured therein by set screws 117. The tubes project in diametrically opposite directions from the hub, and at the outer tips thereof are elbows or bent ends 119 having nozzles 121 which project transversely to the axis of the tubes and in opposite directions.

The housing is provided with a cup 123 through which oil may be introduced into the annular space between the housing and the shaft in order to lubricate the ball bearing and the engaging surfaces of the shaft head and seat. To support the shaft and hold the shaft head up to the seat, there is provided a coil spring 125 encircling the shaft and confined between a collar 127 fast on the shaft and a washer 129 resting upon the washer 95 referred to. A pipe 131 is introduced into the hollow shaft, and rises from and is secured to the washer 97. This pipe is somewhat smaller than the internal diameter of the hollow shaft, and leaves a small annular space 131 between them. Also this pipe rises in the shaft to a point higher than the level of the oil in the housing. The construction is such that if any oil works out between the shaft head and seat and inward along the end of the head, it will rise in the space between the pipe and the shaft, but will not reach a level higher than that of the oil in the housing.

When it is desired to remove materials accumulating on the ring 33 or other parts at the openings between the vanes, compressed air is admitted through the tubular leg, referred to, of the tripod, and passes into the chamber 85, thence upward through the pipe 131 and the hollow shaft to the hub 111, where it divides and passes outward through the two tubes 115, and is discharged through the bent ends 119 and the nozzles 121.

The pipes, hub and tubular shaft are rotated automatically by the reactive pressure of the air at the bent ends of the tubes. The nozzle will move through an orbit adjacent the ring and vanes, and the jets of air issuing therefrom will blow from the ring and other parts at the openings any materials which may have accumulated thereon. It will not be necessary for the clearer device to operate continuously. It will suffice for practicable purposes to operate it occasionally, such, for example, as once or twice in the course of a day's operation of the separator.

When compressed air is introduced into the clearer device 85, it will press down in the annular space between the pipe 131 and the shaft and against the shaft head 103 and thereby tend to hold the head to the seat 105 and prevent oil from escaping between the head and seat. At the same time the capillary attraction of the oil will cause a sufficient amount to get between the surfaces of the head and seat to lubricate them properly. The construction is such that no stuffing box or packing is required at the lower end of the shaft. The use of such packing would not be desirable, because of the necessity for renewing the same from time to time.

This rotary pneumatic means for clearing materials from the openings between the vanes may be appropriately called a pneumatic tourniquet. It is simple and effective in operation, and does not require access thereto, excepting that at long intervals it will be necessary to replenish the supply of oil in the shaft housing.

It will be understood that the invention is not limited to the specific embodiment shown, and that various deviations may be made therefrom without departing from the spirit and scope of the appended claims.

What is claimed is:

1. An air separator for grading materials comprising, in combination, an outer casing, an inner casing comprising upper and lower shells having a space between them, a series of spaced vanes in said space, said inner casing having a separating chamber therein, said casings having a settling chamber between them, means for causing air to circulate through said chambers and through the spaces between said vanes, and means for pneumatically removing from the spaces between said vanes any materials accumulating therein.

2. An air separator for grading materials comprising, in combination, an outer casing, an inner casing comprising upper and lower shells having a space between them, a series of spaced vanes in said space, said inner casing having a separating chamber therein, said casings having a settling chamber between them, means for causing air to circulate through said chambers and through the spaces between said vanes, a support mounted within the inner casing, and means on said support for directing compressed air to the spaces between said vanes to remove any materials accumulating therein.

3. An air separator for grading materials comprising, in combination, an outer casing, an inner casing comprising upper and lower shells having a space between them, a series of spaced vanes in said space, said inner casing having a separating chamber therein, said casings having a settling chamber between them, means for causing air to circulate through said chambers and through the spaces between said vanes, a support mounted within the inner casing, and a pneumatic tourniquet for blowing from the spaces between said vanes any materials accumulating therein.

4. An air separator for grading materials comprising, in combination, an outer casing, an inner casing comprising upper and lower shells having a space between them, a series of spaced vanes in said space, said inner casing having a separating chamber therein, said casings having a settling chamber between them, means for causing air to circulate through said chambers and through the spaces between said vanes, and rotary means in the inner casing for conducting and directing air to the spaces between the vanes to remove any materials accumulating therein.

5. An air separator for grading materials comprising, in combination, an outer casing, an inner casing comprising upper and lower shells having a space between them, a series of spaced vanes in said space, said inner casing having a separating chamber therein, said casings having a settling chamber between them, means for causing air to circulate through said chambers and through the spaces between said vanes, and means for blowing air from the spaces between said vanes comprising a hollow hub, tubes projecting from said hub having their ends bent in opposite directions from the axis of said tubes, and means to conduct compressed air to said hub for delivery through said tubes.

6. An air separator for grading materials comprising, in combination, an outer casing, an inner casing comprising upper and lower shells having a space between them, a series of spaced vanes in said space, said inner casing having a separating chamber therein, said casings having a settling chamber between them, means for causing air to circulate through said chambers and through spaces between said vanes, a tripod supported on the inner casing, a bearing carried by the tripod, a hollow shaft journalled in said bearing, a hub on said shaft, and a pair of tubes projecting from the hub and having oppositely bent ends, said shaft, hub and tubes being adapted to receive air for discharge at the ends of the tubes, the latter being rotated by the reactive pressure of the air at the bent ends of the tubes, thereby to direct the air in a circular path to the spaces between the vanes and clear therefrom any materials accumulating therein.

7. An air separator for grading materials comprising, in combination, an outer casing, an inner casing comprising upper and lower shells having a space between them, a ring on the lower shell, vanes extending from the ring to the upper shell and having spaces between them, means for causing air to circulate between said casings and through the spaces between the vanes into the inner casing, and means for blowing from the ring any materials accumulating thereon.

8. An air separator for grading materials comprising, in combination, an outer casing, an inner casing, said inner casing having a separating chamber therein, and said inner and outer casings having a settling chamber between them, said inner casing having openings, means for causing air to circulate through said chambers and openings, and pneumatic means adapted to be operated at intervals for removing from the openings any materials accumulating therein.

9. An air separator for grading materials comprising, in combination, a separating chamber and a settling chamber having openings between them, and means for blowing from said openings any materials accumulating therein comprising a tripod mounted in the settling chamber, a bearing on the tripod, a hollow shaft journalled in the bearing, a hub on the shaft, and tubes projecting from the hub communicating with the hollow shaft and having oppositely bent ends, one of the legs of the tripod being hollow and in communication with the hollow shaft for conducting compressed air to the hollow shaft for delivery through the tubes.

10. In a separator, a device for clearing materials from openings between the separating and settling chambers comprising a housing having a seat, a hollow shaft in the housing having a head for engagement with the seat, a coil spring encircling the hollow shaft for urging the head toward the seat, said housing and hollow shaft having a lubricant receiving space between them, a hub on the shaft, tubes projecting from the hub and having oppositely bent ends, and means to supply compressed air to the housing for delivery through the hollow shaft, hub and tubes to clear the openings of any materials accumulating therein.

11. In a separator, a device for clearing materials from openings between the separating and settling chambers comprising a support, a housing on the support having a seat, a hollow shaft in the housing having a head, a coil spring encircling the shaft for urging the shaft head against the seat, said housing and shaft having a lubricant receiving space between them, a hollow hub on the shaft, a spider on the hub, a pair of tubes carried by the hub and spider, said tubes having oppositely bent ends, and means for supplying compressed air to the housing for delivery through the shaft, hub and tubes, that jets may be delivered from the bent ends of the latter, rotate the tubes, and clear from the openings any materials accumulating therein.

12. In an air separator, a device for clearing materials from spaces between vanes in a space between the separating and settling chambers comprising a support, a housing on the support, a hollow shaft journalled in the housing and communicating therewith, said shaft and housing having a space between them for receiving a lubricant for said shaft, means to prevent the lubricant from being carried from said space up through the shaft, a hub on the shaft, tubes projecting from the hub having oppositely bent ends, said housing, shaft, hub and tubes being adapted to have compressed air pass therethrough for rotating the tubes and clearing from said spaces any materials accumulated therein.

13. In an air separator, a device for clearing materials from openings between the separating and settling chambers comprising a housing having a seat, a hollow shaft in the housing having a head engaging the seat, said housing having an oil space for lubricating the seat and head, a pair of tubes carried by the shaft having bent ends, and means to conduct compressed air to the shaft for delivery to the tubes, said shaft head being exposed to the compressed air, thereby substantially to prevent escape of oil between the head and seat.

14. In an air separator, a device for clearing materials from openings between the separating and settling chambers comprising a housing having a seat, a hollow shaft in the housing having a head engaging the seat, a coil spring for urging the head to the seat, tubes carried by the shaft having bent ends, said housing having an oil space for lubricating the seat and head, and means to conduct compressed air to the shaft for delivery to the tubes, said shaft head being exposed to the compressed air, thereby substantially to prevent escape of oil between the head and the seat.

THOMAS J. STURTEVANT.